United States Patent
Wang et al.

(10) Patent No.: US 11,936,418 B2
(45) Date of Patent: Mar. 19, 2024

(54) RADAR SYSTEM WITH SELF-INTERFERENCE CANCELLING FUNCTION

(71) Applicant: KaiKuTek Inc., Taipei (TW)

(72) Inventors: Mike Chun-Hung Wang, Taipei (TW); Chun-Hsuan Kuo, San Diego, CA (US); Mohammad Athar Khalil, Irvine, CA (US); Wen-Sheng Cheng, Taipei (TW); Chen-Lun Lin, Taipei (TW); Chin-Wei Kuo, Taichung (TW); Ming Wei Kung, Tainan (TW); Khoi Duc Le, New Taipei (TW)

(73) Assignee: KAIKUTEK INC., Taipei (TW)

( * ) Notice: Subject to any disclaimer, the term of this patent is extended or adjusted under 35 U.S.C. 154(b) by 219 days.

(21) Appl. No.: 17/241,482

(22) Filed: Apr. 27, 2021

(65) Prior Publication Data

US 2022/0345173 A1 Oct. 27, 2022

(51) Int. Cl.
| | |
|---|---|
| *H04B 1/525* | (2015.01) |
| *G01S 7/02* | (2006.01) |
| *G01S 7/34* | (2006.01) |
| *H04B 1/04* | (2006.01) |

(52) U.S. Cl.
CPC .............. *H04B 1/525* (2013.01); *G01S 7/023* (2013.01); *G01S 7/34* (2013.01); *H04B 1/0475* (2013.01)

(58) Field of Classification Search
None
See application file for complete search history.

(56) References Cited

U.S. PATENT DOCUMENTS

| | | | |
|---|---|---|---|
| 6,956,517 B1 | 10/2005 | Baker et al. | |
| 9,887,862 B2 | 2/2018 | Zhou et al. | |
| 9,985,772 B1* | 5/2018 | Johnson | H04B 1/525 |
| 10,649,067 B1 | 5/2020 | Yang et al. | |
| 2006/0111074 A1* | 5/2006 | Petilli | H03M 3/496 |
| | | | 455/313 |
| 2014/0269950 A1* | 9/2014 | Sutterlin | H04B 3/54 |
| | | | 375/257 |
| 2019/0036747 A1* | 1/2019 | Heck | H04L 27/14 |
| 2019/0372628 A1* | 12/2019 | Balteanu | H04B 7/0848 |

(Continued)

FOREIGN PATENT DOCUMENTS

TW    I379526 B    12/2012

*Primary Examiner* — Adnan Baig
(74) *Attorney, Agent, or Firm* — RABIN & BERDO, P.C.

(57) ABSTRACT

A radar signal processing system with a self-interference cancelling function includes an analog front end (AFE) processor, an analog to digital converter (ADC), an adaptive interference canceller (AIC), and a digital to analog converter (DAC). The AFE processor receives an original input signal and generates an analog input signal. The ADC converts the analog input signal to a digital input signal. The AIC generates a digital interference signal digital interference signal by performing an adaptive interference cancellation process according to the digital input signal. The DAC converts the digital interference signal to an analog interference signal. Finally, the analog interference signal is fed back to the AFE and cancelled from the original input signal in the AFE processor while performing the front end process, reducing the interference of the static interference from the leaking of a close-by transmitter during the front end process.

8 Claims, 9 Drawing Sheets

(56) References Cited

U.S. PATENT DOCUMENTS

2021/0018464 A1\* 1/2021 Ali .................... B01L 3/502761
2021/0033371 A1\* 2/2021 Frey, Jr. ................ G01J 1/0219
2021/0151052 A1\* 5/2021 Kang ...................... G10L 15/18
2022/0345173 A1\* 10/2022 Wang ................... H04B 1/0475

\* cited by examiner

RADAR SYSTEM WITH SELF-INTERFERENCE CANCELLING FUNCTION

BACKGROUND OF THE INVENTION

1. Field of the Invention

The present invention relates to a radar system, and more particularly to a radar system with a self-interference cancelling function.

2. Description of the Related Art

With reference to FIG. 8, frequency modulated continuous wave (FMCW) radar system is a type of radar system with a processor 81, a transmitter 82, and a receiver 83. The transmitter 82 broadcasts a detecting signal, which is a continuous wave with known frequency, wherein the detecting signal hits a target object A1 and is reflected by the target object A1. The reflected detecting signal is then received by the receiver 83. Since the frequency of the transmitted signal is known and the frequency of the reflected detecting signal is also detected, the processor 81 calculates the speed and distance of the target object A1 according to the principle of the Doppler Effect and frequency response. However, since the transmitter 82 and the receiver 83 are disposed nearby, the leakage of the detecting signal will also be received by the receiver 83. The leakage of the detecting signal is an unwanted signal interfering with the actual received reflected detecting signal, which causes miscalculation of the processor 81. Such situation is also known as self-interference of the radar system.

With reference to FIG. 9, a conventional approach to solve the self-interference problem is disposing an Adaptive Interference Canceller (AIC) in a digital signal processor. The processor 81 may include an analog font end (AFE) 811 to perform front end processing of the detecting signal and an analog-digital converter (ADC) 812 to convert the detecting signal to a digital detecting signal, and then the digital detecting signal is passed to a digital signal processor (DSP) 813 for further calculation. The AIC 813A in the DSP 813 is usually implemented for calculating the static interference signal from a static object in the environment. The static interference signal should include the leaking detecting signal from the transmitter by theory. However, if the intensity of the leaking detecting signal received by the receiver 83 is above a certain threshold, leaking the detecting signal may cause saturation at the AFE 811 of the processor 81. The saturation in the AFE 811 results in severe performance degradation.

Furthermore, to avoid the saturation in the analog front end of the processor 81, the system needs to achieve isolation between the receiver 83 and the transmitter 82. However, in real case, the technique of antenna isolation in such radar system can only achieve 20-30 dB of isolation effect between the antenna of the transmitter 82 and the antenna of the receiver 83, and is not enough for a radar system requiring precise detection and calculating outcome.

SUMMARY OF THE INVENTION

An objective of the present invention is to provide a processing system radar signal processing system with a self-interference cancelling function.

To achieve the foregoing objective, the processing system radar signal processing system of the present invention includes:
 a signal input end, electrically connected to the receiver antenna and receiving the original input signal;
 an analog front end (AFE) processor, electrically connected to the signal input end, and performing a front end process according to the original input signal and generating an analog input signal;
 an analog to digital converter (ADC), electrically connected to the AFE processor, and converting the analog input signal to a digital input signal;
 an adaptive interference canceller (AIC), electrically connected to the ADC, performing an adaptive interference cancellation process to the digital input signal and generating a digital interference signal; and
 a digital to analog converter (DAC), electrically connected to the AIC, converting the digital interference signal to an analog interference signal, and outputting the analog interference signal to the AFE processor;
 wherein
 the AFE processor cancels the analog interference signal from the original input signal while performing the front end process.

In the present invention, the digital interference signal generated by the AIC is further converted to an analog interference signal by the DAC, and the analog interference signal is transmitted to the AFE processor for cancelling the interference part in the original input signal. Since the analog interference signal is the calculated static interference signal, which includes the self-interference signal received from the transmitter, the self-interference part in the original input signal is also canceled or at least downgraded by a wide margin. The feedback loop directly reduces the self-interference leakage from the transmitter in the AFE, therefore avoiding the risk of saturation in the AFE processor.

Other objectives, advantages and novel features of the invention will become more apparent from the following detailed description when taken in conjunction with the accompanying drawings.

DETAILED DESCRIPTION OF THE INVENTION

Figure 1:
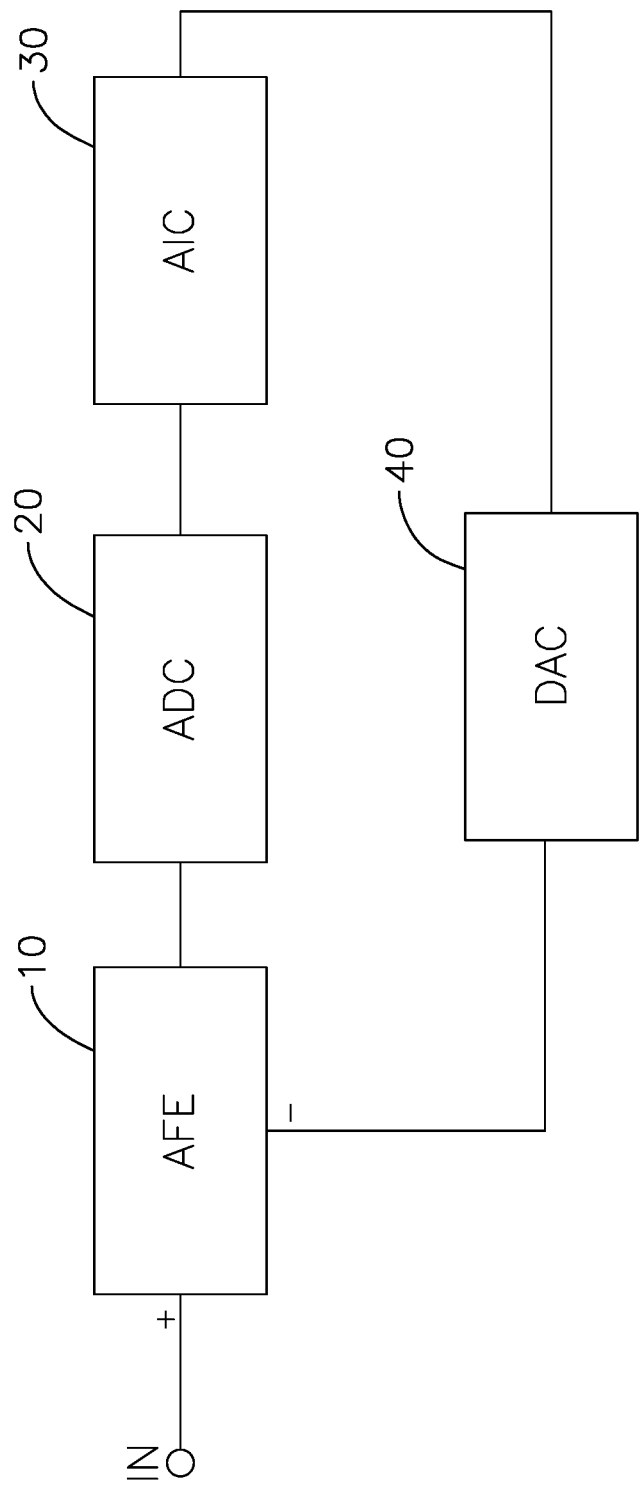
FIG. 1 is a block diagram of the radar signal processing system of the present invention.

With reference to FIG. 1, radar signal processing system with a self-interference cancelling function in accordance with the present invention includes a signal input end IN, an analog front end (AFE) processor 10, an analog to digital converter (ADC) 20, an adaptive interference canceller (AIC) 30, and a digital to analog converter (DAC) 40. The signal input end IN is electrically connected to a receiver antenna and receives an original input signal through the receiver antenna. The AFE processor 10 is electrically connected to the signal input end IN, and performs a front end process according to the original input signal and generates an analog input signal. The ADC 20 is electrically connected to the AFE processor 10 and converts the analog input signal to a digital input signal. The AIC 30 is electrically connected to the ADC 20, performs an adaptive interference cancellation process to the digital input signal, and generates a digital interference signal. The DAC 40 is electrically connected to the AIC 30, converts the digital interference signal to an analog interference signal, and outputs the analog interference signal to the AFE processor 10. The AFE processor 10 cancels the analog interference signal from the original input signal while performing the front end process.

The AFE processor 10 of the present invention may be constructed in various structures, and performs different levels of front end processing in different methods according to the system requirement. In a first embodiment, the AFE processor 10 includes a trans-impedance amplifier (TIA) 11 and a programmable gain amplifier (PGA) 12. The TIA 11 is electrically connected to the signal input end IN, and receives the original input signal. The PGA 12 is electrically connected between the TIA 11 and the ADC 20; wherein the original input signal is transformed to the analog input signal through the TIA 11 and the PGA 12, and the analog input signal is outputted to the ADC 20 from the PGA 12.

Figure 2:
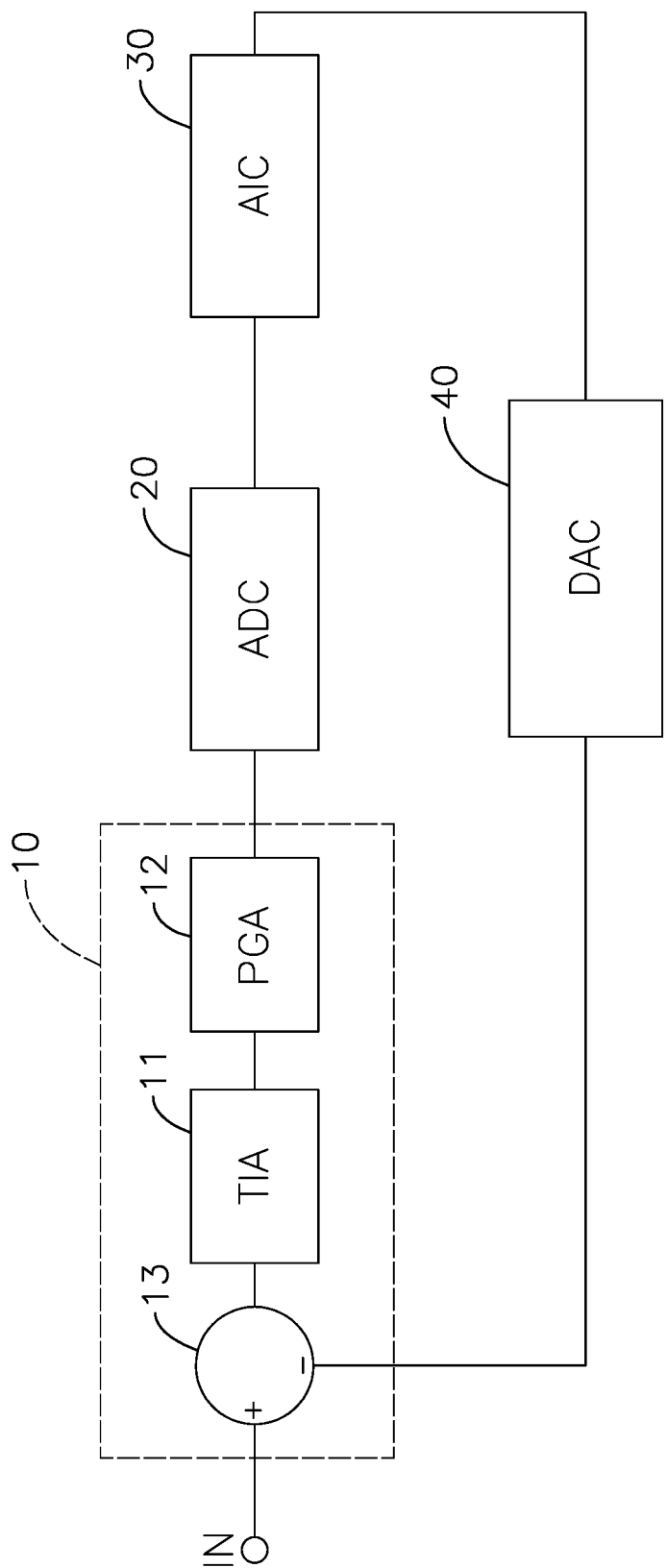
FIG. 2 is a block diagram of a first embodiment of the radar signal processing system of the present invention.

The analog interference signal may be fed to the AFE processor 10 with a feedback unit 13. With reference to FIG. 2, in a first embodiment of the present invention, the TIA 11 is connected to the signal input end IN through the feedback unit 13, and the feedback unit 13 is also connected to the DAC 40 to receive the analog interference signal. The feedback unit 13 cancels the analog interference signal from the original input signal, and outputs the original input signal after the cancellation to the TIA 11.

Figure 3:
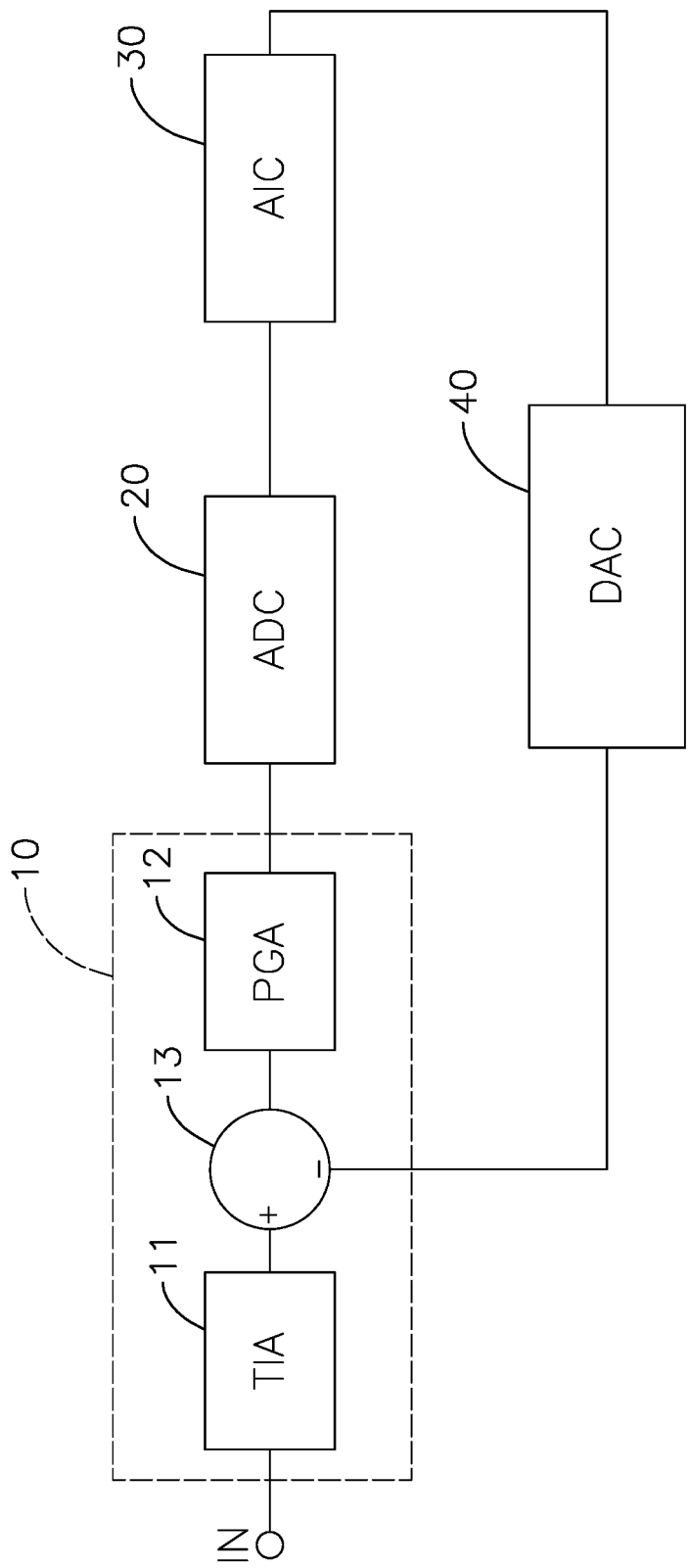
FIG. 3 is a block diagram of a second embodiment of the radar signal processing system of the present invention.

With reference to FIG. 3, in a second embodiment of the present invention, it is the PGA 12 that is connected to the TIA 11 through the feedback unit 13. That is, the feedback unit 13 is connected between the TIA 11 and the PGA 12. The feedback unit 13 receives the original input signal from the TIA 11. The feedback unit 13 is also connected to the DAC 40 and receives the analog interference signal. The feedback unit 13 cancels the analog interference signal from the original input signal received from the TIA 11, and outputs the original input signal after cancellation to the PGA 12.

Figure 4:
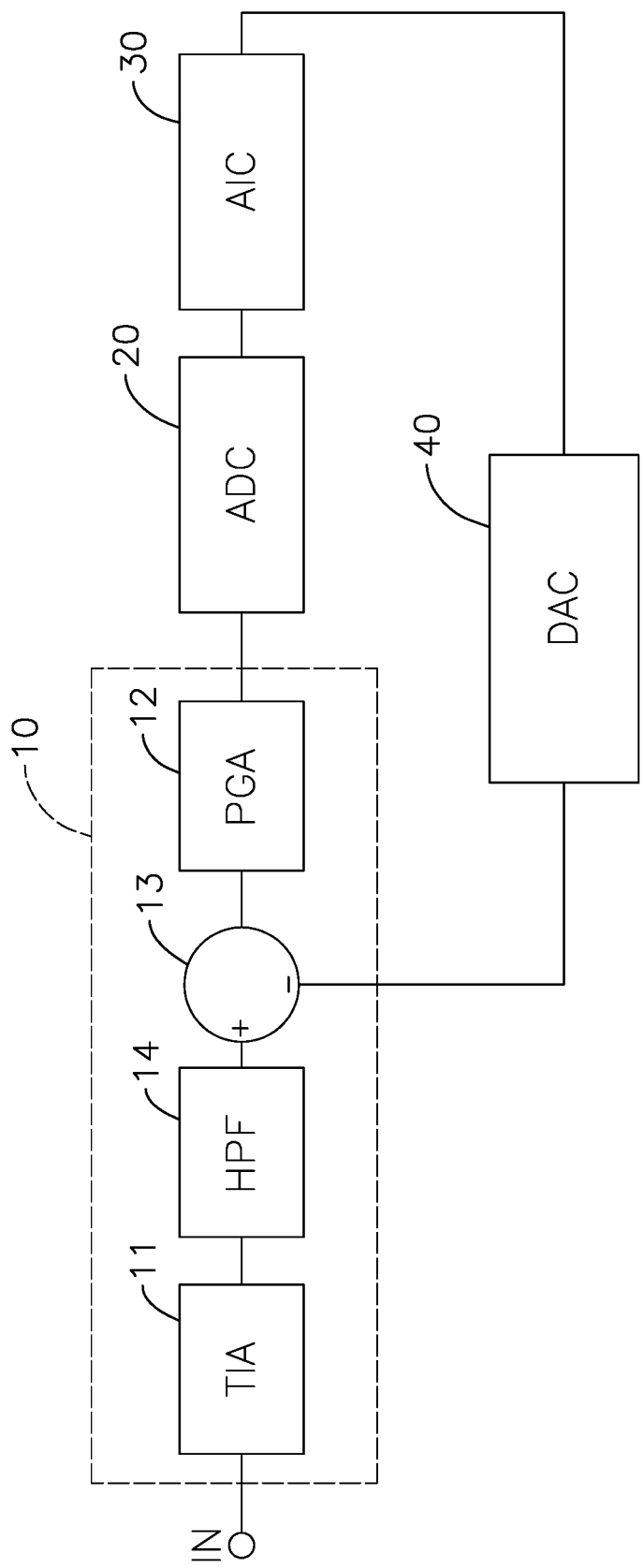
FIG. 4 is a block diagram of the radar signal processing system of the present invention.

With reference to FIG. 4, the AFE processor 10 may further include a high pass filter (HPF) 14, connected between the TIA 11 and the feedback unit 13, such that the feedback unit 13 is connected to the TIA 11 through the HPF 14. Therefore, the HPF 14 receives the original input signal from the TIA 11, and the HPF 14 filters the original input signal from the TIA 11 before outputting the original output signal to the feedback unit 13. In this case, the original input signal is filtered before the cancellation of the analog interference signal and then outputted to the PGA 12.

Figure 5:
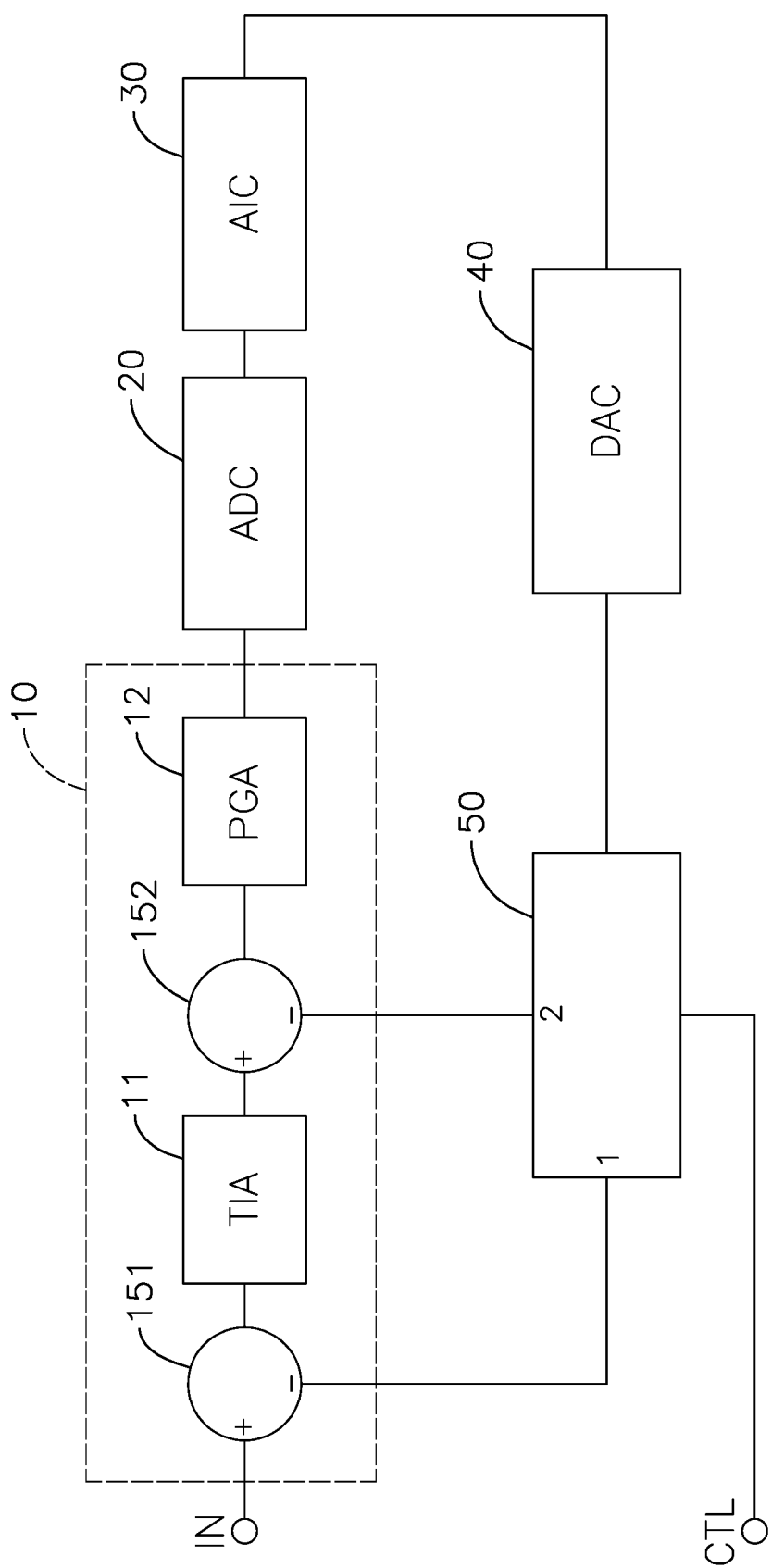
FIG. 5 is a block diagram of a third embodiment of the radar signal processing system of the present invention.

With reference to FIG. 5, in a third embodiment of the present invention, the processing system further includes a control input end CTL, which receives a control signal. The AFE processor 10 includes the TIA 11, the PGA 12, a first feedback unit 151, a second feedback unit 152, and a first switching module 50. The TIA 11 is connected to the signal input end IN through the first feedback unit 151, and the PGA 12 is connected to the TIA 11 through the second feedback unit 152. The first switching module 50 is connected to the DAC 40 and the control input end CTL, and has a first output end and a second output end, the first output end is electrically connected to the first feedback unit 151, and the second output end is electrically connected to the second feedback unit 152.

When the control signal is a first value, the first switching module 50 outputs the analog interference signal to the first feedback unit 151, and the first feedback unit 151 cancels the analog interference signal from the original input signal, and outputs the original input signal after the cancellation to the TIA 11.

In another case, when the control signal is a second value, the first switching module 50 outputs the analog interference signal to the second feedback unit 152, and the second feedback unit 152 cancels the analog interference signal from the original input signal received from the TIA 11, and outputs the original input signal after cancellation to the PGA 12.

In the present embodiment, the first switching module 50 provides a selection mechanism for the feedback point of the analog interference signal. The negative feedback may be inputted to the TIA 11 either before or after the cancellation.

Figure 6:
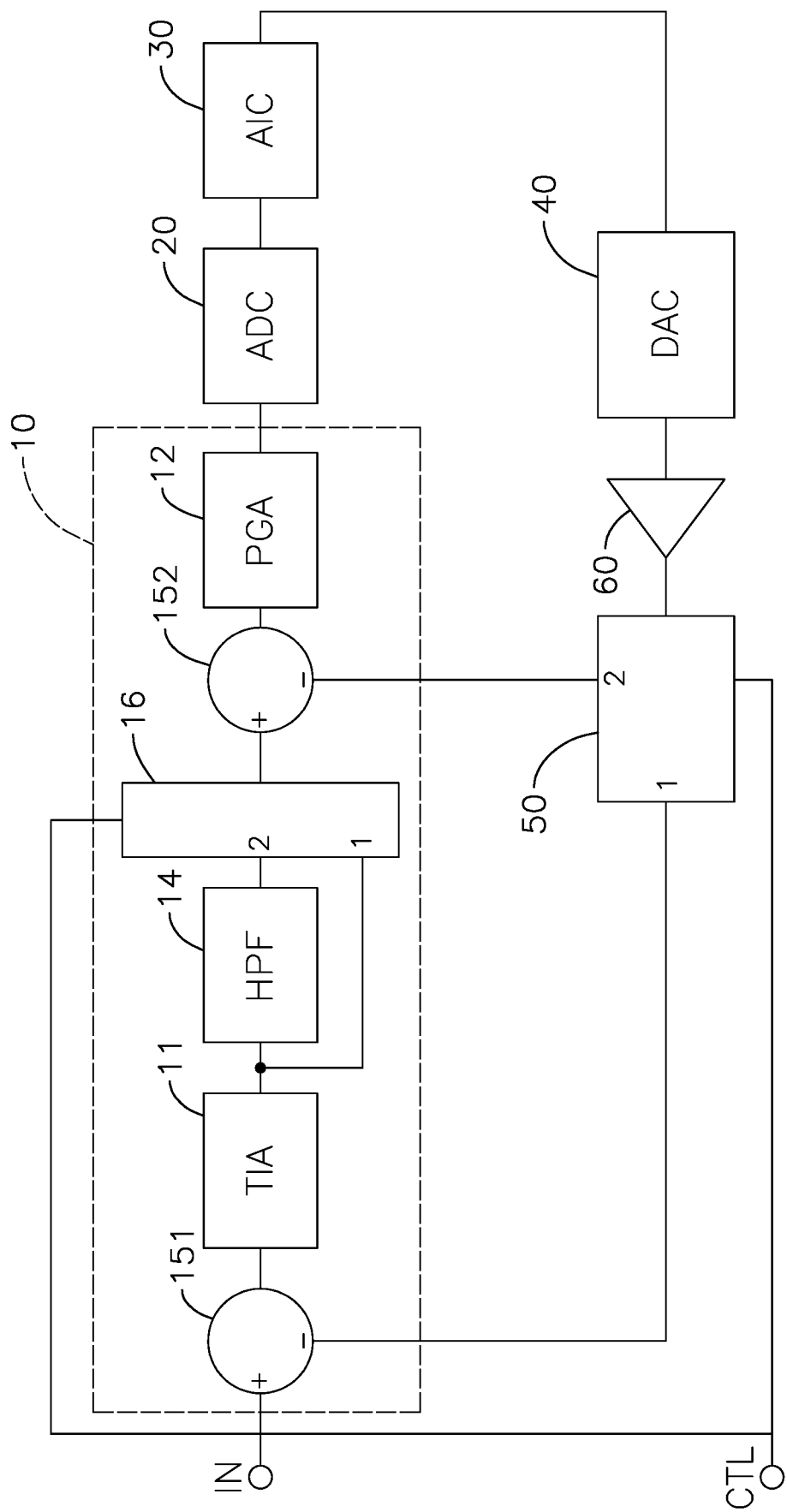
FIG. 6 is a block diagram of a fourth embodiment of the radar signal processing system of the present invention.

With reference to FIG. 6, in a fourth embodiment of the present invention, the processing system also includes the control input end CTL. The AFE processor 10 includes the TIA 11, the PGA 12, the HPF 14, a first feedback unit 151, a second feedback unit 152, a first switching module 50, and a second switching module 16. The first switching module 50 is connected to the DAC 40 and the control input end CTL, and has a first output end and a second output end. The TIA 11 is electrically connected to the signal input end IN through the first feedback unit 151. The first feedback unit 151 is also connected to the first output end of the first switching module 50. The HPF 14 is electrically connected to the TIA 11, and filters the original input signal received from the TIA 11. The second feedback unit 152 is electrically connected to the second output end of the first switching module 50. The second switching module 16 is electrically connected to the control input end CTL, and has a first input end, a second input end, and an output end. The first input end is connected to the TIA 11, the second input end is connected to the HPF 14, and the output end is connected to the second feedback unit 152. The PGA 12 is electrically connected between the second feedback unit 152 and the ADC 20.

With the connection of the present embodiment as stated above, the operation of the radar signal processing system is further described below.

When the control signal is a first value, the first switching module 50 outputs the analog interference signal to the first feedback unit 151, and the first feedback unit 151 cancels the analog interference signal from the original input signal, and outputs the original input signal after the cancellation to the TIA 11; the second switching module 16 outputs the original input signal after the cancellation from the TIA 11 to the second feedback unit 152, and the second feedback unit 152 passes the original input signal after the cancellation to the PGA 12.

When the control signal is a second value, the second switching module 16 outputs the analog interference signal to the second feedback unit 152; wherein the TIA 11 receives the original input signal through the first feedback unit 151, the HPF 14 filters the original input signal, the second switching unit outputs the original input signal after filtering to the second feedback unit 152, and the second feedback unit 152 cancels the analog interference signal from the original input signal after filtering, and outputs the original input signal after cancellation to the PGA 12.

In the present embodiment, the AFE switches between two different processing routes according to the control signal. The first switching module 50 determines which of the first feedback unit 151 (before TIA 11) and the second feedback unit 152 (after HPF 14) to output the analog interference signal, such that the feedback unit that receives the analog interference signal performs the cancellation, and the other feedback unit simply passes the received input signal to the next unit. The second switching module 16 determines if the original input signal is filtered by the HPF 14. When the control signal is the first value, the analog interference signal is outputted to the first feedback unit 151 by the first switching module 50, and the original input signal after cancellation outputted from the TIA 11 is directly outputted to the second feedback unit 152, bypassing the HPF 14. When the control signal is the second value, the analog interference signal is outputted to the second feedback unit 152 by the first switching module 50. The TIA 11 receives the original input signal without cancellation through the first feedback unit 151, and the cancellation of the analog interference signal is done by the second feedback unit 152 after the filtering of the HPF 14.

Figure 7:
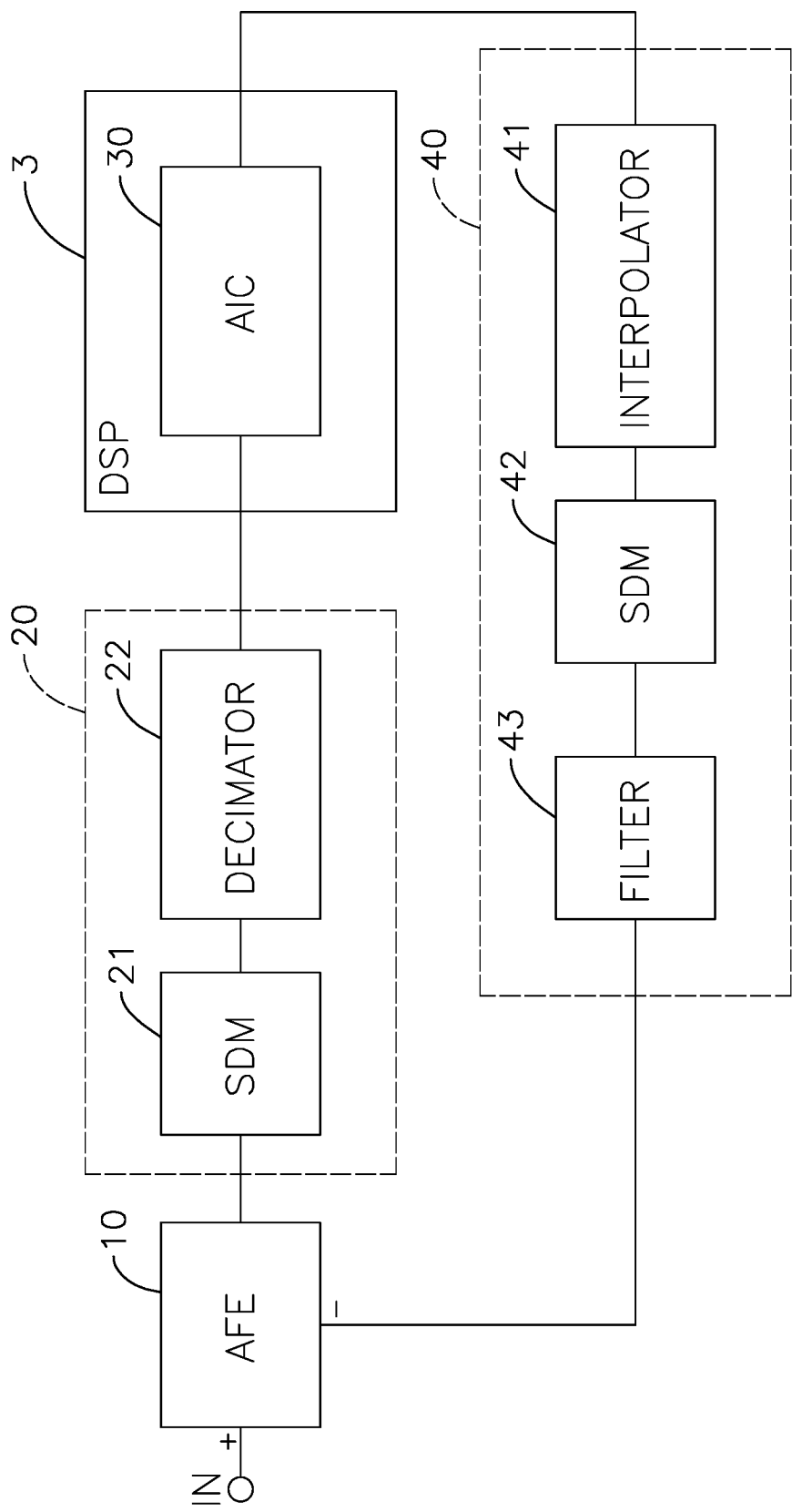
FIG. 7 is another detailed block diagram of the radar signal processing system of the present invention.
Figure 8:
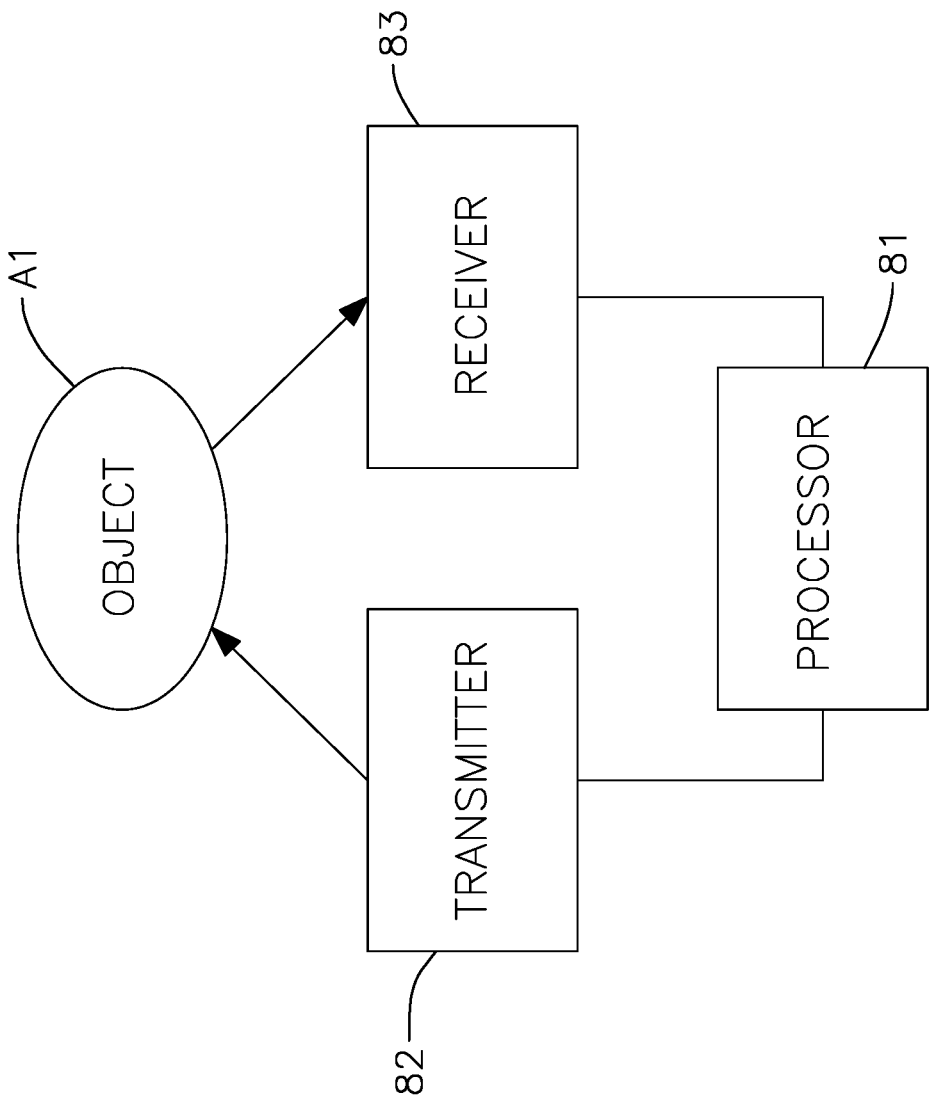
FIG. 8 is a schematic diagram of a conventional FMCW radar system.
Figure 9:
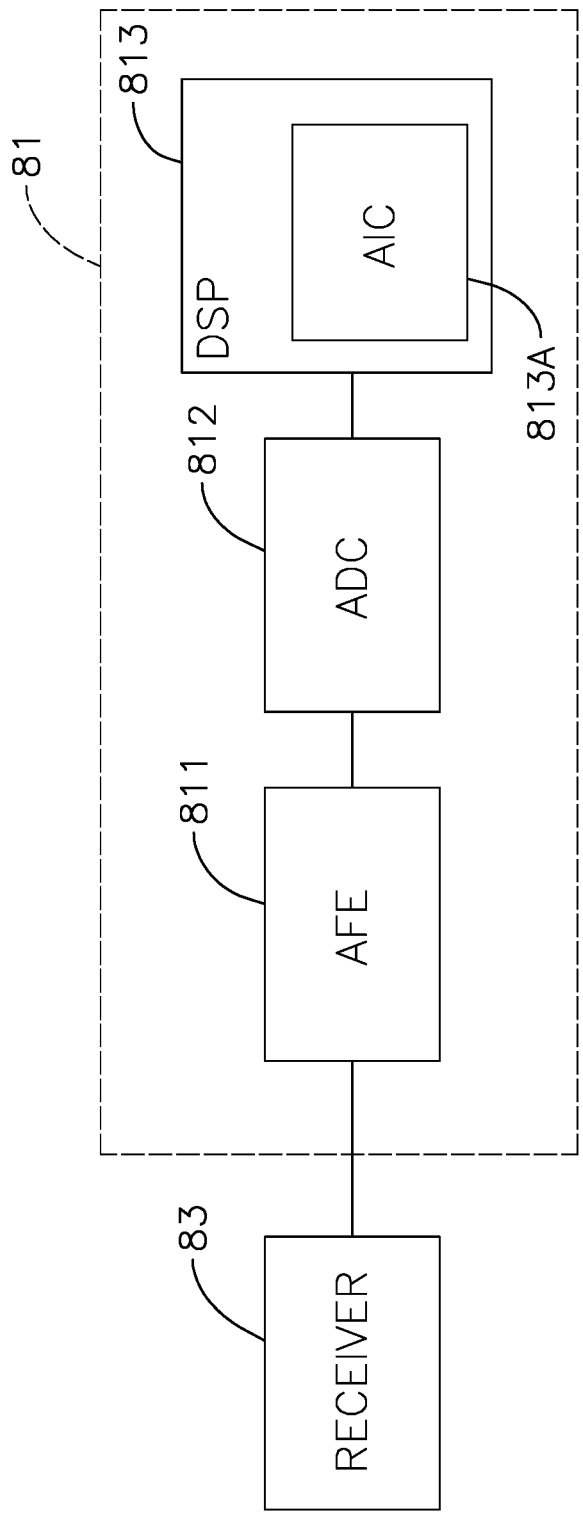
FIG. 9 is a block diagram of a conventional processor of the FMCW radar system.

With reference to FIG. 7, the ADC 20 of the radar signal processing system in the present invention may include a sigma-delta modulator (SDM) 21 and a decimator filter 22. The SDM 21 is electrically connected to the AFE processor 10, generating an initial digital signal according to the analog input signal. The decimator filter 22 is electrically connected to the SDM 21, sampling the initial digital signal and generating the digital input signal. Preferably, the AIC 30 is mounted on a digital signal processor (DSP) 3.

The DAC 40 may include an interpolator 41, a sigma-delta modulator (SDM) 42, and a filter 43. The interpolator 41 is electrically connected to the AIC 30, receiving the digital interference signal. The SDM 42 is electrically connected to the interpolator 41. The filter 43 is electrically connected between the SDM 42 and the AFE processor 10.

In an embodiment, the radar signal processing system further includes an amplifier 60, wherein the DAC 40 is connected to the feedback unit 13, the first feedback unit 151 or the second feedback unit 152 through the amplifier 60.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A radar signal processing system with a self-interference cancelling function, receiving an original input signal through a receiver antenna, and comprising:
    a control input end, receiving a control signal;
    a signal input end, electrically connected to the receiver antenna and receiving the original input signal;
    an analog front end (AFE) processor, electrically connected to the signal input end, and performing a front end process according to the original input signal and generating an analog input signal;
    an analog to digital converter (ADC), electrically connected to the AFE processor, and converting the analog input signal to a digital input signal;
    an adaptive interference canceller (AIC), electrically connected to the ADC, performing an adaptive interference cancellation process to the digital input signal, and generating a digital interference signal; and
    a digital to analog converter (DAC), electrically connected to the AIC, converting the digital interference signal to an analog interference signal, and outputting the analog interference signal to the AFE processor;
    wherein
    the AFE processor cancels the analog interference signal from the original input signal while performing the front end process, and comprises:
        a trans-impedance amplifier (TIA), electrically connected to the signal input end, and receiving the original input signal,
        a programmable gain amplifier (PGA), electrically connected between the TIA and the ADC; wherein the original input signal is transformed to the analog input signal through the TIA and the PGA, and the analog input signal is outputted to the ADC from the PGA,
        a first feedback unit, wherein the TIA is connected to the signal input end through the first feedback unit,
        a second feedback unit, wherein the PGA is connected to the TIA through the second feedback unit, and
        a first switching module, connected to the DAC and the control input end, having a first output end and a second output end, wherein the first output end is electrically connected to the first feedback unit, and the second output end is electrically connected to the second feedback unit;
    when the control signal is a first value, the first switching module outputs the analog interference signal to the first feedback unit, and the first feedback unit cancels the analog interference signal from the original input signal, and outputs the original input signal after the cancellation to the TIA; and
    when the control signal is a second value, the first switching module outputs the analog interference signal to the second feedback unit, and the second feedback unit cancels the analog interference signal from the original input signal received from the TIA, and outputs the original input signal after cancellation to the PGA.

2. A radar signal processing system with a self-interference cancelling function, receiving an original input signal through a receiver antenna, and comprising:
    a control input end, receiving a control signal;
    a signal input end, electrically connected to the receiver antenna and receiving the original input signal;
    an analog front end (AFE) processor, electrically connected to the signal input end, and performing a front end process according to the original input signal and generating an analog input signal;
    an analog to digital converter (ADC), electrically connected to the AFE processor, and converting the analog input signal to a digital input signal;
    an adaptive interference canceller (AIC), electrically connected to the ADC, performing an adaptive interference cancellation process to the digital input signal, and generating a digital interference signal;
    a digital to analog converter (DAC), electrically connected to the AIC, converting the digital interference signal to an analog interference signal, and outputting the analog interference signal to the AFE processor; and a first switching module, connected to the DAC and the control input end, having a first output end and a second output end; wherein the AFE processor cancels the analog interference signal from the original input signal while performing the front end process, and comprises:

a trans-impedance amplifier (TIA);

a first feedback unit, wherein the TIA is electrically connected to the signal input end through the first feedback unit, and the first feedback unit is also connected to the first output end of the first switching module;

a high-pass filter (HPF), electrically connected to the TIA and filtering the original input signal;

a second feedback unit, electrically connected to the second output end of the first switching module;

a second switching module, electrically connected to the control input end, and having a first input end, a second input end, and an output end; wherein the first input end is connected to the TIA, the second input end is connected to the HPF, and the output end is connected to the second feedback unit;

a programmable gain amplifier (PGA), electrically connected between the second feedback unit and the ADC;

when the control signal is a first value, the first switching module outputs the analog interference signal to the first feedback unit, and the first feedback unit cancels the analog interference signal from the original input signal, and outputs the original input signal after the cancellation to the TIA; the second switching module outputs the original input signal after the cancellation from the TIA to the second feedback unit, and the second feedback unit passes the original input signal after the cancellation to the PGA; and when the control signal is a second value, the second switching module outputs the analog interference signal to the second feedback unit; wherein the TIA receives the original input signal through the first feedback unit, the HPF filters the original input signal, the second switching unit outputs the original input signal after filtering to the second feedback unit, and the second feedback unit cancels the analog interference signal from the original input signal after filtering, and outputs the original input signal after cancellation to the PGA.

3. The radar signal processing system as claimed in claim 1, wherein the ADC comprises:

a sigma-delta modulator (SDM), electrically connected to the AFE processor and generating an initial digital signal according to the analog input signal; and a decimator filter, electrically connected to the SDM, sampling the initial digital signal and generating the digital input signal.

4. The radar signal processing system as claimed in claim 1, wherein the DAC comprises:

an interpolator, electrically connected to the AIC and receiving the digital interference signal;

a sigma-delta modulator (SDM), electrically connected to the interpolator; and a filter, electrically connected between the SDM and the AFE processor.

5. The radar signal processing system as claimed in claim 1, wherein the AIC is mounted in a digital signal processor.

6. The radar signal processing system as claimed in claim 2, wherein the ADC comprises:

a sigma-delta modulator (SDM), electrically connected to the AFE processor and generating an initial digital signal according to the analog input signal; and a decimator filter, electrically connected to the SDM, sampling the initial digital signal and generating the digital input signal.

7. The radar signal processing system as claimed in claim 2, wherein the DAC comprises:

an interpolator, electrically connected to the AIC and receiving the digital interference signal;

a sigma-delta modulator (SDM), electrically connected to the interpolator; and a filter, electrically connected between the SDM and the AFE processor.

8. The radar signal processing system as claimed in claim 2, wherein the AIC is mounted in a digital signal processor.

* * * * *